US010059054B2

(12) United States Patent
Matsen et al.

(10) Patent No.: US 10,059,054 B2
(45) Date of Patent: Aug. 28, 2018

(54) WELDING THERMOPLASTIC STRUCTURES

(71) Applicant: The Boeing Company, Chicago, IL (US)

(72) Inventors: Marc Rollo Matsen, Seattle, WA (US); Mark A. Negley, Bellevue, WA (US); William C. Dykstra, Rockford, MI (US); Robert James Miller, Fall City, WA (US)

(73) Assignee: The Boeing Company, Chicago, IL (US)

( * ) Notice: Subject to any disclaimer, the term of this patent is extended or adjusted under 35 U.S.C. 154(b) by 404 days.

(21) Appl. No.: 14/753,538

(22) Filed: Jun. 29, 2015

(65) Prior Publication Data

US 2016/0375629 A1    Dec. 29, 2016

(51) Int. Cl.
| | |
|---|---|
| *B29C 65/36* | (2006.01) |
| *B29C 65/04* | (2006.01) |
| *B29C 65/00* | (2006.01) |
| *B29C 70/30* | (2006.01) |
| *B64C 1/00* | (2006.01) |

(Continued)

(52) U.S. Cl.
CPC ............ *B29C 65/04* (2013.01); *B29C 65/364* (2013.01); *B29C 65/3632* (2013.01); *B29C 65/3636* (2013.01); *B29C 65/3668* (2013.01); *B29C 65/3676* (2013.01); *B29C 65/3684* (2013.01); *B29C 66/112* (2013.01); *B29C 66/131* (2013.01); *B29C 66/524* (2013.01); *B29C 66/532* (2013.01); *B29C 66/61* (2013.01); *B29C 66/63* (2013.01); *B29C 66/7212* (2013.01); *B29C 66/72141* (2013.01); *B29C 66/73921* (2013.01); *B29C 66/843* (2013.01); *B29C 66/8432* (2013.01); *B29C 70/30* (2013.01); *B64C 1/00* (2013.01); *B29K 2101/12* (2013.01);

(Continued)

(58) Field of Classification Search
CPC ... B29C 65/04; B29C 65/1438; B29C 65/148; B29C 65/1496; B29C 65/3668; B29D 99/0001; H05B 6/06; H05B 6/08; H05B 6/40; H05B 6/101; H05B 6/365
See application file for complete search history.

(56) References Cited

U.S. PATENT DOCUMENTS

| | | | |
|---|---|---|---|
| 5,624,594 A | * | 4/1997 | Matsen .................. B32B 37/06 219/633 |
| 5,645,744 A | | 7/1997 | Matsen et al. |

(Continued)

FOREIGN PATENT DOCUMENTS

| | | |
|---|---|---|
| EP | 2538749 A1 | 12/2012 |
| WO | 2012158293 A1 | 11/2012 |
| WO | WO2014054793 A1 | 4/2014 |

OTHER PUBLICATIONS

Extended European Search Report, dated Nov. 23, 2016, regarding Application No. EP16163728.5, 7 pages.

(Continued)

*Primary Examiner* — William P Bell
(74) *Attorney, Agent, or Firm* — Yee & Associates, P.C.

(57) ABSTRACT

A method and apparatus for welding a thermoplastic structure. The apparatus comprises a base, a cover, and a channel. The base is formed of a material that is magnetically opaque to a frequency in a range of 30 KHz to 350 KHz. The cover is formed of the material. The channel extends between the base and the cover.

19 Claims, 9 Drawing Sheets

(51) Int. Cl.
  *B29L 31/30* (2006.01)
  *B29K 101/12* (2006.01)
  *B29K 105/08* (2006.01)
(52) U.S. Cl.
  CPC ............... *B29K 2105/0881* (2013.01); *B29L 2031/3076* (2013.01); *B29L 2031/3085* (2013.01)

(56) References Cited

U.S. PATENT DOCUMENTS

| | | | |
|---|---|---|---|
| 5,710,414 A | 1/1998 | Matsen et al. | |
| 6,566,635 B1 | 5/2003 | Matsen et al. | |
| 8,480,031 B2* | 7/2013 | Gauthie | B64C 1/064 244/120 |
| 9,586,362 B2 | 3/2017 | Matsen et al. | |
| 2005/0035115 A1 | 2/2005 | Anderson et al. | |
| 2006/0231981 A1* | 10/2006 | Lee | B29C 33/307 264/320 |
| 2008/0251969 A1* | 10/2008 | Isham | B29C 51/085 264/316 |
| 2008/0302915 A1* | 12/2008 | Yip | B29C 70/342 244/132 |
| 2015/0013888 A1 | 1/2015 | Matsen et al. | |
| 2015/0137427 A1 | 5/2015 | Matsen et al. | |
| 2015/0282256 A1* | 10/2015 | Iguro | H05B 6/104 219/645 |

OTHER PUBLICATIONS

Matsen et al., "Thermoplastic Welding Apparatus and Method," U.S. Appl. No. 13/109,061, filed May 17, 2011, 24 pages.
Matsen et al., "Susceptor Welding Tape," U.S. Appl. No. 14/546,184, filed Nov. 18, 2014, 43 pages.
PCT Search Report dated Nov. 19, 2013, regarding Application No. PCT/US2012/033794, 7 pages.
PCT Search Report dated Jul. 25, 2012, regarding Application No. PCT/US2012/033794, 5 pages.
PCT Search Report dated Nov. 17, 2013, regarding Application No. PCT/US2012/033794, 6 pages.
Matsen et al., "Conformable Induction Coils for Induction Joining," U.S. Appl. No. 14/021,468, filed Sep. 9, 2013, 50 pages.

* cited by examiner

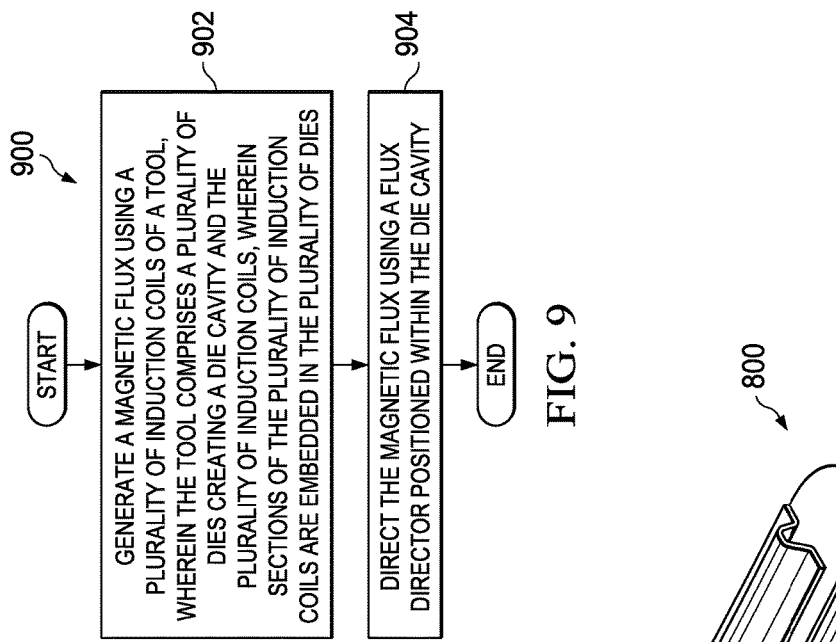
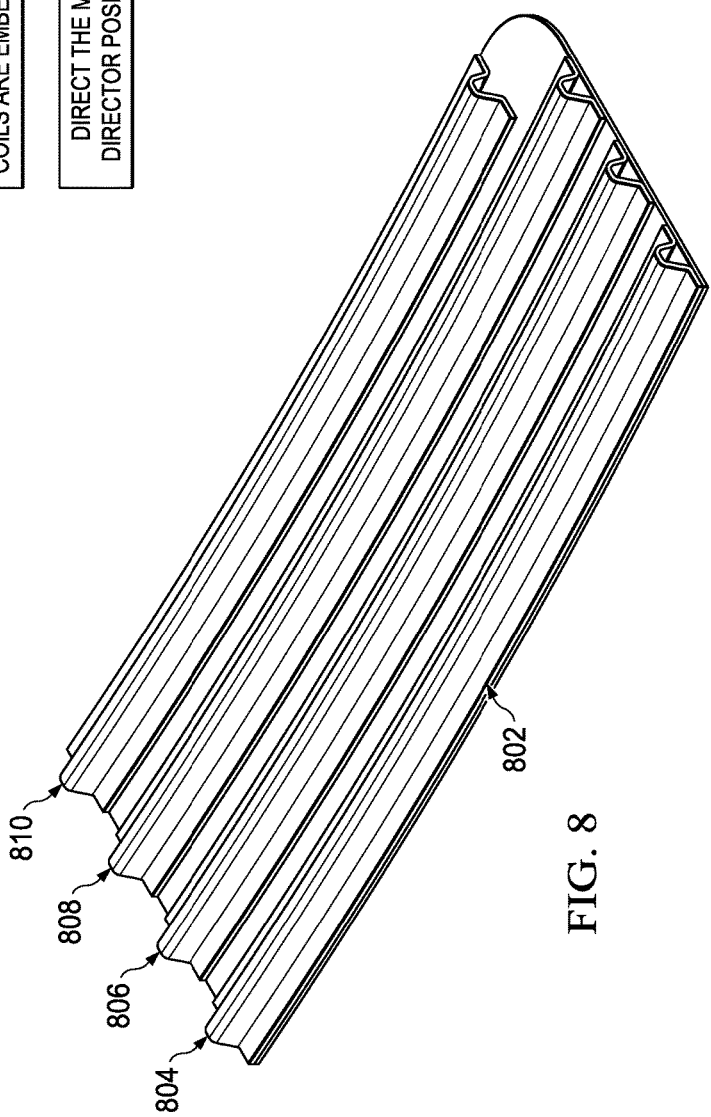
FIG. 8
FIG. 9

WELDING THERMOPLASTIC STRUCTURES

BACKGROUND INFORMATION

1. Field

The present disclosure relates generally to the formation of composite structures. More particularly, the present disclosure relates to welding thermoplastic composite structures. Still more particularly, the present disclosure relates to a method and apparatus for directing a magnetic flux to weld a structure comprising a thermoplastic material.

2. Background

Aircraft are being designed and manufactured with greater and greater percentages of composite materials. Composite materials are used in aircraft to decrease the weight of the aircraft. This decreased weight improves performance features such as payload capacity and fuel efficiency. Further, composite materials provide longer service life for various components in an aircraft.

Composite materials may be tough, light-weight materials created by combining two or more functional components. For example, a composite material may include reinforcing fibers bound in a polymer resin matrix. Resins used in composite materials may include thermoplastic or thermoset resins. A thermoplastic material may become soft upon heating and may harden upon cooling. A thermoplastic material may be able to be repeatedly heated and cooled. A thermoset material may become hard when heated. The fibers may be unidirectional or may take the form of a woven cloth or fabric.

In manufacturing composite structures, layers of composite material are typically laid up on a tool. The layers may be comprised of fibers in sheets. These sheets may take the form of fabrics, tape, tows, or other suitable forms. In some cases, resin may be infused or preimpregnated into the sheets. Sheets that are preimpregnated with resin are commonly referred to as prepreg.

The different layers of prepreg may be laid up in different orientations and different numbers of layers may be used depending on the thickness of the composite structure being manufactured. These layers may be laid up by hand or by using automated equipment such as a fiber placement system. After the layers of composite material have been laid up on the tool, the layers of composite material may be consolidated or cured upon exposure to temperature and pressure, thus forming the final composite component.

Three major joining technologies are generally used for composite structures: mechanical fastening, adhesive bonding, and welding. A thermoplastic weld is created when the thermoplastic material on the surface of two composite components is heated to the melting or softening point and the two surfaces are brought into contact so that the molten thermoplastic mixes. Then, the surfaces are held in contact while the thermoplastic cools below the softening temperature to fuse the thermoplastic into the thermoplastic weld.

In composite welding, induction welding processes may be used. The composite components may be placed substantially parallel to the magnetic flux during induction welding processes. When the magnetic flux is not substantially parallel to a composite component, undesirable heating may occur in the composite material. For example, when the fibers are electrically conductive, undesirable heating may occur in the composite material. For example, heating at locations other than the welding surface may occur. Undesirable heating may be greater when the frequency is above 30 KHz.

Therefore, it would be desirable to have a method and apparatus that take into account at least some of the issues discussed above, as well as other possible issues. For example, it may be desirable to have a method and apparatus to allow for induction welding of composite components that are not positioned substantially parallel to the magnetic flux.

SUMMARY

In an illustrative embodiment, an apparatus is provided. The apparatus comprises a base, a cover, and a channel. The base is formed of a material that is magnetically opaque to a frequency in a range of 30 KHz to 350 KHz. The cover is formed of the material. The channel extends between the base and the cover.

In another illustrative embodiment, an apparatus is provided. The apparatus comprises a tool and a flux director. The tool comprises a plurality of dies and a plurality of induction coils. The plurality of dies defines a die cavity. Sections of the plurality of induction coils are embedded in the plurality of dies. The flux director is positioned within the die cavity.

In yet another illustrative embodiment, a method is provided. A magnetic flux is generated using a plurality of induction coils of a tool. The tool comprises a plurality of dies and the plurality of induction coils. The plurality of dies creates a die cavity. Sections of the plurality of induction coils are embedded in the plurality of dies. The magnetic flux is directed using a flux director positioned within the die cavity.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8 is an illustration of a structure produced in accordance with an illustrative embodiment;

FIG. 9 is an illustration of a flowchart of a process for welding a thermoplastic structure in accordance with an illustrative embodiment;

DETAILED DESCRIPTION

The different illustrative embodiments recognize and take into account a number of different considerations. For example, the illustrative embodiments recognize and take into account that even and parallel lines of magnetic flux may be produced in the interior of a solenoidal coil. A tool having a solenoidal coil may be used to weld components formed of composite material to form a structure.

Currently, composite components may include graphite fibers or other electrically conductive fibers. Currently, for composite components having graphite fibers and being welded in an induction tool, the components are placed substantially parallel to the applied oscillating magnetic flux. For example, a composite stiffener may be placed substantially parallel to the applied oscillating magnetic flux. When the magnetic flux is parallel to the skin of a composite component, there is no current path within the thermoplastic composite component.

When components cannot be located parallel to the oscillating magnetic flux produced by the coil, internal inductive heating of the composite material itself may occur. Specifically, when the frequency is above 30 KHz, undesirable heating may occur in portions of a composite component that are positioned substantially perpendicular to the oscillating magnetic flux. When a composite component is substantially perpendicular to the magnetic flux, an eddy current may be able to swirl in a circular pattern in the surface of the component. Electrons may be driven in a circular pattern from graphite fiber to graphite fiber of the composite component. When a composite component is substantially perpendicular to the magnetic flux, the eddy current may produce undesirable heating.

Figure 1:
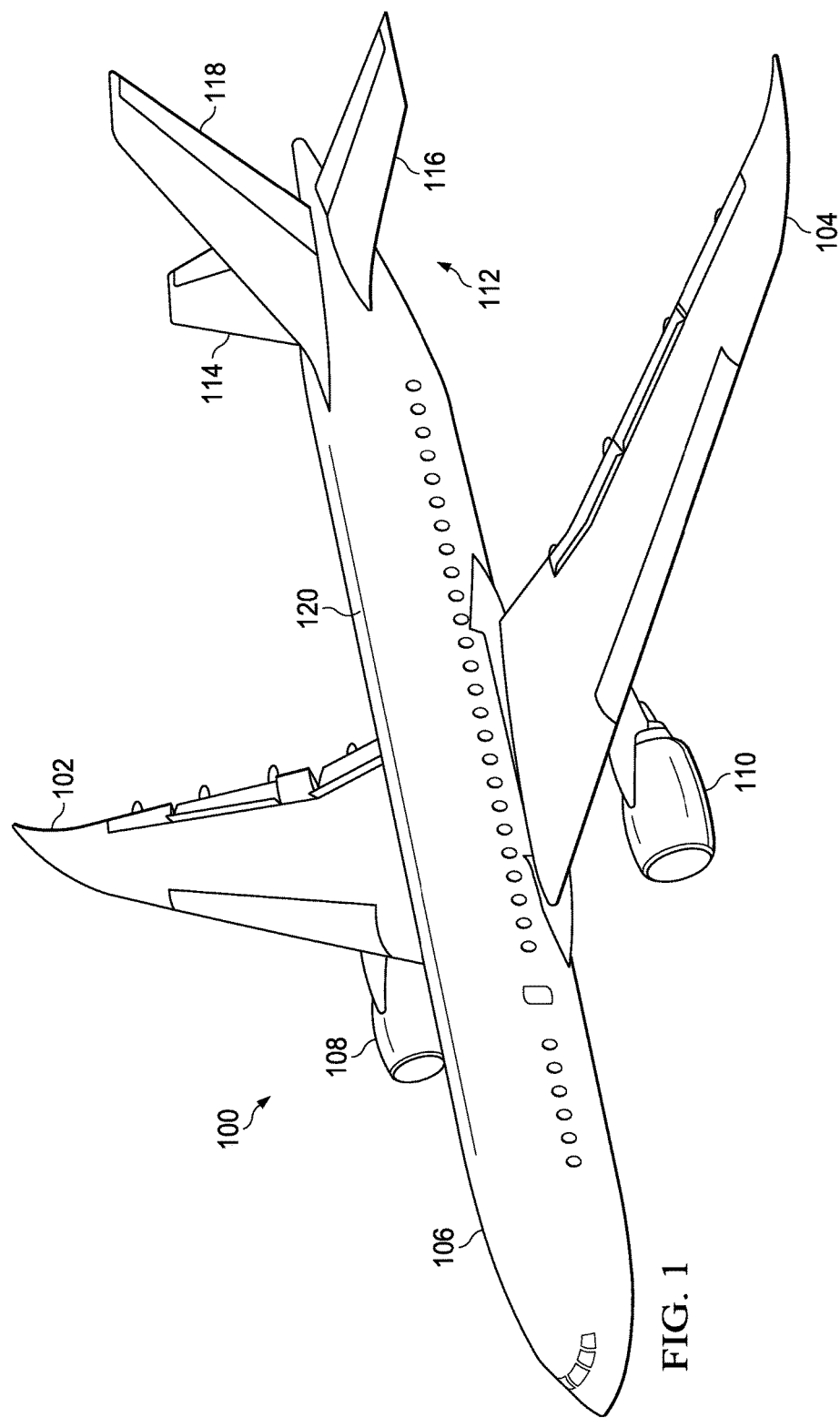
FIG. 1 is an illustration of an aircraft in accordance with an illustrative embodiment may be implemented.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106. Body 106 may have composite skin 120.

Aircraft 100 is an example of an aircraft in which welded thermoplastic structures may be implemented in accordance with an illustrative embodiment. In one illustrative example, a structural support such as a spar, rib, or other structural support of wing 102, wing 104, or body 106 welded to another component may comprise a thermoplastic structure. For example, a structural support of body 106 welded to composite skin 120 may comprise a welded thermoplastic structure.

The illustration of aircraft 100 in FIG. 1 is not meant to imply physical or architectural limitations to the manner in which an illustrative configuration may be implemented. For example, although aircraft 100 is a commercial aircraft, aircraft 100 may be a military aircraft, a rotorcraft, helicopter, unmanned aerial vehicle, or any other suitable aircraft.

Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a windmill, a manufacturing facility, a building, and other suitable platforms.

Figure 2:
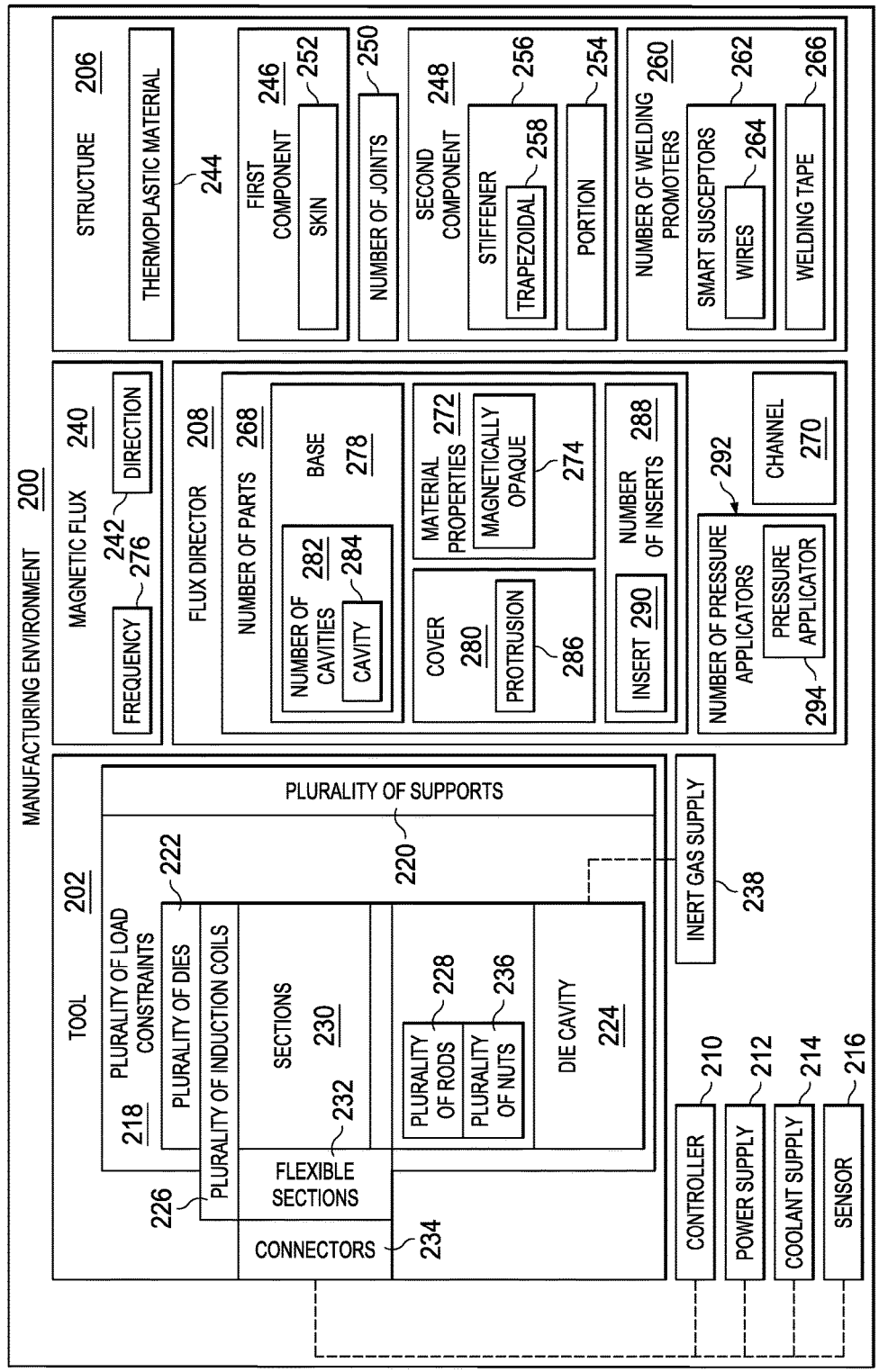
FIG. 2 is an illustration of a block diagram of a manufacturing environment in accordance with an illustrative embodiment.

With reference now to FIG. 2, an illustration of a block diagram of a manufacturing environment is depicted in accordance with an illustrative embodiment. In this illustrative example, manufacturing environment 200 in FIG. 2 is depicted in block form to illustrate different components for one or more illustrative embodiments. In this depicted example, manufacturing environment 200 includes tool 202, structure 206, flux director 208, controller 210, power supply 212, coolant supply 214, and sensor 216.

Tool 202 is configured to weld structure 206. As used herein, welding comprises applying elevated temperature, elevated pressure, or elevated temperature and pressure to a thermoplastic material such that the thermoplastic material flows. Welding may result in joining at least two components to form structure 206.

Tool 202 comprises plurality of load constraints 218 supported by plurality of supports 220. Tool 202 also comprises plurality of dies 222 located within plurality of load constraints 218. Die cavity 224 may be a space created by plurality of dies 222. Die cavity 224 may be configured to contain structure 206 during a consolidation process.

Plurality of dies 222 may be formed of a material which is not susceptible to inductive heating. In some illustrative examples, plurality of dies 222 may be formed from a ceramic, a composite, a phenolic, or some other desirable material. In one illustrative example, the material for plurality of dies 222 may be selected based on a coefficient of thermal expansion, thermal shock resistance, and compression strength. In this illustrative example, the material may be selected to have a low coefficient of thermal expansion, desirable thermal shock resistance, and relatively high compression strength. In one illustrative example, plurality of dies 222 may be a castable fused silica ceramic.

As depicted, plurality of dies 222 contains plurality of induction coils 226 and plurality of rods 228. Plurality of induction coils 226 have sections 230 and flexible sections 232. Sections 230 of plurality of induction coils 226 may be embedded in plurality of dies 222. In some illustrative examples, sections 230 may extend along the length of each die of plurality of dies 222. Flexible sections 232 of plurality of induction coils 226 may join sections 230 of different dies in plurality of dies 222. In one illustrative example, flexible sections 232 may have adequate flexibility to move as plurality of dies 222 move. In one illustrative example, flexible sections 232 may have adequate flexibility to move to connect sections 230. Plurality of induction coils 226 may be connected to controller 210, power supply 212, coolant supply 214, and sensor 216 through connectors 234 attached to flexible sections 232.

Controller 210 may be configured to control the input power fed to plurality of induction coils 226 by power supply 212. By controlling the input power, controller 210 may control the magnetic flux produced by plurality of induction coils 226. By controlling the magnetic flux produced by plurality of induction coils 226, controller 210 may control the operating temperature of tool 202.

Controller 210 may be implemented in software, hardware, firmware or a combination thereof. When software is used, the operations performed by controller 210 may be implemented in program code configured to run on a processor unit. When firmware is used, the operations performed by controller 210 may be implemented in program code and data and stored in persistent memory to run on a processor unit. When hardware is employed, the hardware may include circuits that operate to perform the operations in controller 210.

Coolant supply 214 may be configured to supply coolant to plurality of induction coils 226. Coolant flowing through plurality of induction coils 226 may function as a heat exchanger to transfer heat out of tool 202. Sensor 216 may be configured to measure a temperature of a portion of tool 202 during operation.

Plurality of rods 228 may be embedded within plurality of dies 222. Plurality of rods 228 may provide reinforcement for plurality of dies 222. In one illustrative example, plurality of rods 228 is formed from fiberglass. Plurality of rods 228 can be threaded on the ends and may be held in place by plurality of nuts 236. Plurality of nuts 236 may be installed to apply tension to plurality of rods 228. In some illustrative examples, plurality of rods 228 may extend longitudinally through a die in plurality of dies 222. In some illustrative examples, plurality of rods 228 may extend transversely through a die in plurality of dies 222. In some illustrative examples, plurality of rods 228 may extend both longitudinally and transversely through a die in plurality of dies 222.

Die cavity 224 is associated with inert gas supply 238. During consolidation of structure 206, inert gas may be present in die cavity 224 from inert gas supply 238.

Plurality of induction coils 226 may generate magnetic flux 240. Magnetic flux 240 may run in direction 242. Direction 242 may be substantially perpendicular to plurality of induction coils 226 in die cavity 224.

Direction 242 may be non-parallel to at least a portion of structure 206 when structure 206 is positioned in die cavity 224. For example, direction 242 may be substantially perpendicular to at least a portion of structure 206 when structure 206 is positioned in die cavity 224.

Structure 206 may be formed of thermoplastic material 244. Structure 206 may include first component 246 and second component 248. First component 246 and second component 248 may be connected by number of joints 250. First component 246 may take the form of skin 252. In some illustrative examples, skin 252 may be substantially parallel to direction 242 of magnetic flux 240 when structure 206 is in die cavity 224 of tool 202.

Second component 248 may have portion 254 that is substantially non-parallel to direction 242 of magnetic flux 240 when structure 206 is in die cavity 224 of tool 202. In some illustrative examples, second component 248 may take the form of stiffener 256. In some illustrative examples, stiffener 256 may be trapezoidal 258. In some illustrative examples, portion 254 may be a leg of trapezoidal 258 stiffener 256.

Structure 206 may also include number of welding promoters 260. Number of welding promoters 260 may be positioned in number of joints 250. Prior to welding, number of welding promoters 260 may be positioned such that number of welding promoters 260 contacts the surface of first component 246 and the surface of second component 248. After welding, number of welding promoters 260 may be contained in number of joints 250.

Number of welding promoters 260 may include smart susceptors 262. Smart susceptors 262 may be formed of a material configured to generate heat when exposed to magnetic flux 240. The material of smart susceptors 262 may be selected from a metal, a metal alloy, a ceramic, a metalized film, or any other suitable material. In some illustrative examples, smart susceptors 262 comprise a metallic alloy having ferromagnetic properties. In some illustrative examples, a ferromagnetic material for smart susceptors 262 may be selected based on a desired welding temperature. For example, the material for smart susceptors 262 may be selected based on a temperature at which a ferromagnetic material becomes non-magnetic. This temperature is also known as a Curie temperature. A ferromagnetic material may be selected for smart susceptors 262 such that the Curie temperature for the ferromagnetic material corresponds to a desired welding temperature.

Smart susceptors 262 may generate heat when exposed to magnetic flux 240 generated by plurality of induction coils 226. Smart susceptors 262 may be used to apply heat to number of joints 250 of structure 206 during a welding process.

In some illustrative examples, smart susceptors 262 may take the form of wires 264. When number of welding promoters 260 are placed between first component 246 and second component 248, number of welding promoters 260 may be placed such that wires 264 are substantially parallel to direction 242 of magnetic flux 240. In some illustrative examples, number of welding promoters 260 may take the form of welding tape 266 having smart susceptors 262 in the form of wires 264.

To weld structure 206, flux director 208 may be placed into die cavity 224 of tool 202. First component 246 and second component 248 may be placed in flux director 208 in tool 202. Plurality of induction coils 226 may then be activated to generate magnetic flux 240. Flux director 208 may direct magnetic flux 240 to number of joints 250. In some illustrative examples, when flux director 208 changes direction 242 of magnetic flux 240, flux director 208 may be referred to as focusing, directing, or channeling magnetic flux 240. In some illustrative examples, flux director 208 may block magnetic flux 240 from encountering portion 254.

Flux director 208 includes number of parts 268 forming channel 270. Number of parts 268 may have material properties 272. Material properties 272 may include desirable properties for at least one of conductivity, machinability, melting temperature, elasticity, material cost, or other material characteristics of flux director 208. Material properties 272 may include the material being magnetically opaque 274. When number of parts 268 is magnetically opaque 274, magnetic flux 240 may not travel through number of parts 268. The material of number of parts 268 may block magnetic flux 240. When number of parts 268 is magnetically opaque 274, it may not block all frequencies of magnetic fields. A material may be selected for number of parts 268 based on frequency 276 of magnetic flux 240. In some illustrative examples, frequency 276 may be in the range of 30 KHz to 350 KHz. As a result, magnetically opaque 274 may mean opaque to magnetic flux 240 having frequency 276 in the range of 30 KHz to 350 KHz. In some illustrative examples, flux director 208 may be formed of aluminum or an aluminum alloy.

Number of parts 268 may include base 278 and cover 280. Base 278 may include number of cavities 282 including cavity 284. Structure 206 may be inserted into cavity 284 of base 278. Cover 280 may be placed over structure 206. Channel 270 may extend between base 278 and cover 280. Magnetic flux 240 may not flow through base 278. Base 278 may prevent magnetic flux 240 from encountering portions of structure 206 such as portion 254 at a substantially non-parallel angle. Magnetic flux 240 may flow through channel 270. Channel 270 may direct magnetic flux 240 through at least part of structure 206. Channel 270 may direct magnetic flux 240 towards number of welding promoters 260.

In some examples, cover 280 may be substantially planar. In some examples, cover 280 may include protrusion 286. Protrusion 286 may extend into cavity 284. Changing at least one of the shape or size of at least one of protrusion 286 or cavity 284 may change at least one of the size or shape of channel 270. As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. The item may be a particular object, thing, or a category. In other words, at least one of means any combination of items and number of items may be used from the list but not all of the items in the list are required.

In some illustrative examples, flux director 208 may optionally include number of inserts 288. In some illustrative examples, number of inserts 288 may be formed of material that is magnetically opaque 274. Number of inserts 288 may be optionally placed within number of cavities 282. In one optional example, insert 290 may be placed into cavity 284. Second component 248 may be placed over insert 290. First component 246 may be placed over second component 248.

In some illustrative examples, to apply pressure to each component of structure 206, flux director 208 may include number of pressure applicators 292. For example, an optional pressure applicator 294 may be associated with insert 290. Pressure applicator 294 may be positioned between base 278 and insert 290. Pressure applicator 294 may be activated to apply pressure to second component 248.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, second component 248 may not have portion 254 that is non-parallel to direction 242. In some illustrative examples, at least one portion of skin 252 may be substantially non-parallel to direction 242 of magnetic flux 240 when structure 206 is in die cavity 224 of tool 202.

As another example, although stiffener 256 is described as being trapezoidal 258, stiffener 256 may have any desirable shape. Stiffener 256 may be V-shaped, U-shaped, I-shaped, J-shaped, Z-shaped, square-shaped, or any other desirable shape.

For example, plurality of rods 228 may instead be formed of a material other than fiberglass. In this example, a plurality of reinforcing rods may be formed of a material which is preferably not electrically conductive. In another example, the plurality of reinforcing rods may be formed of an electrically conductive material and arranged such that they are not susceptible to induction heating.

Figure 3:
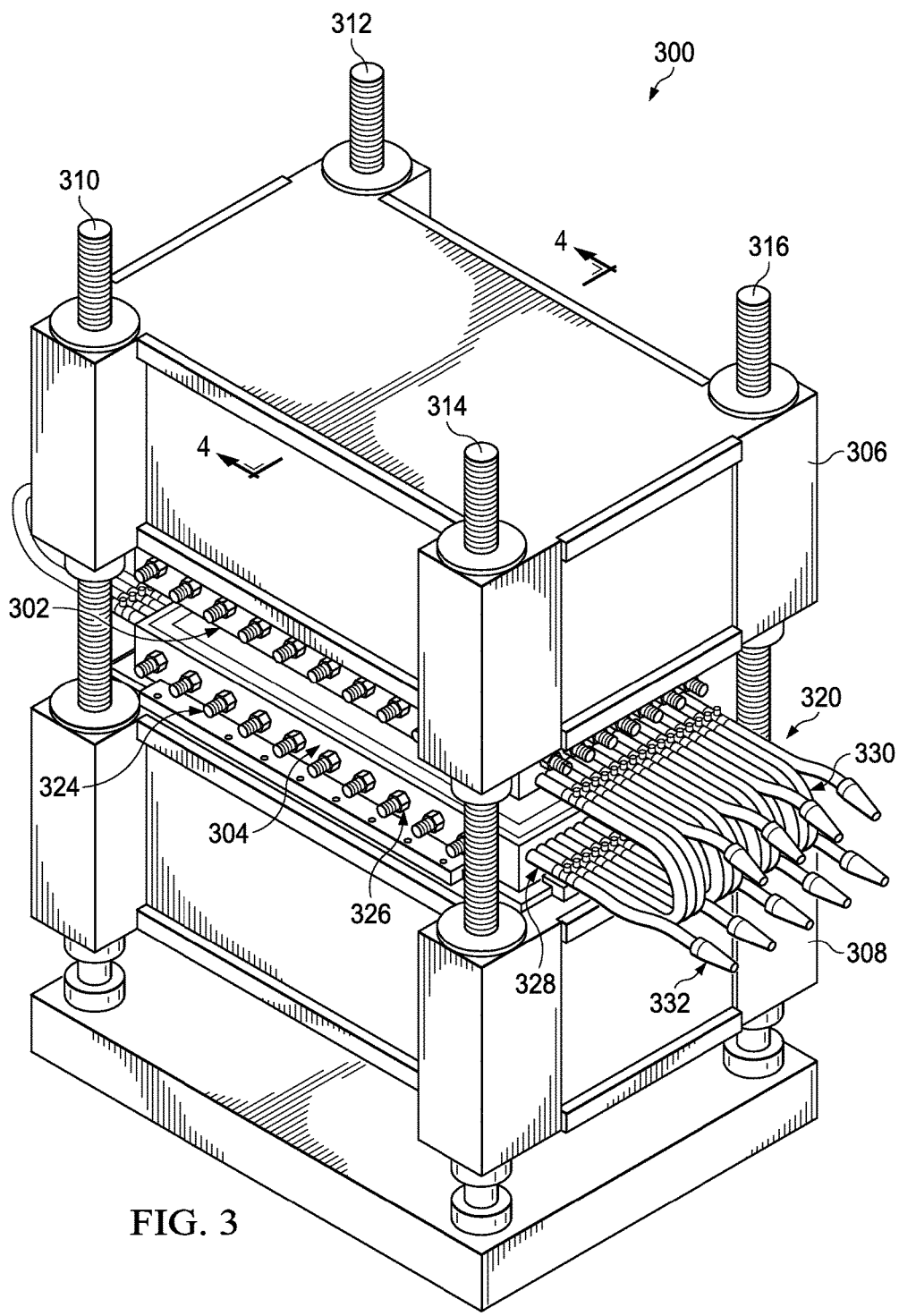
FIG. 3 is an illustration of a perspective view of a tool in accordance with an illustrative embodiment.

Turning now to FIG. 3, an illustration of a perspective view of a tool is depicted in accordance with an illustrative embodiment. In this depicted example, tool 300 is an example of a physical implementation for tool 202 and components in tool 202 shown in block form in FIG. 2.

In this illustrative example, tool 300 includes first die 302 and second die 304. First die 302 and second die 304 may be a physical implementation of plurality of dies 222 of FIG. 2. As depicted, first die 302 is mounted within load constraint 306 and second die 304 is mounted within load constraint 308. Load constraint 306 and load constraint 308 may be a physical implementation of plurality of load constraints 218 of FIG. 2. First die 302 and second die 304 may be attached to load constraint 306 and load constraint 308, respectively, by any suitable fastening device such as bolting or clamping.

As depicted, load constraint 306 and load constraint 308 are mounted on column support 310, column support 312, column support 314, and column support 316. Column support 310, column support 312, column support 314, and column support 316 may be physical implementations of plurality of supports 220 of FIG. 2. Load constraint 306 and load constraint 308 provide backing surfaces for first die 302 and second die 304. Load constraint 306 and load constraint 308 may prevent first die 302 and second die 304 from bending and cracking during manufacturing operations. Load constraint 306 and load constraint 308 may be formed from steel, aluminum, or any other desirable material. Material for load constraint 306 and load constraint 308 may be selected based on the loads present during forming or consolidation. In some illustrative examples, the material may be nonmagnetic to reduce any distortion to the magnetic flux produced by plurality of induction coils 320. In some illustrative examples, load constraint 306 and load constraint 308 may not be present. In these illustrative examples, first die 302 and second die 304 may be strong enough to prevent bending or cracking.

First die 302 and second die 304 are reinforced with plurality of rods 324 that are held with plurality of nuts 326. Plurality of rods 324 may be a physical implementation of plurality of rods 228 of FIG. 2. Plurality of nuts 326 may be a physical implementation of plurality of nuts 236 of FIG. 2. Plurality of rods 324 extends both longitudinally and transversely in a grid through first die 302 and second die 304.

Plurality of induction coils 320 are associated with first die 302 and second die 304. Plurality of induction coils 320 may be a physical implementation of plurality of induction coils 226 of FIG. 2. Plurality of induction coils 320 comprises sections 328 and flexible sections 330. As depicted, sections 328 extend along the length of first die 302 and second die 304. Sections 328 may be embedded in first die 302 and second die 304. Sections 328 may be a physical implementation of sections 230 of FIG. 2. Flexible sections 330 join sections 328 in first die 302 and second die 304. Flexible sections 330 may be a physical implementation of flexible sections 232 of FIG. 2. Connectors 332 located at the ends of plurality of induction coils 320 may connect plurality of induction coils 320 to a controller, power source, coolant supply, or other external utility. Connectors 332 may be a physical implementation of connectors 234 of FIG. 2.

The illustration of tool 300 in FIG. 3 is not meant to imply physical or architectural limitations to the manner in which an illustrative embodiment may be implemented. Other components in addition to or in place of the ones illustrated may be used. Some components may be unnecessary.

For example, plurality of rods 324 may extend in only one direction within first die 302 and second die 304. As another example, although only first die 302 and second die 304 are depicted, tool 300 may instead have three or more dies.

Figure 4:
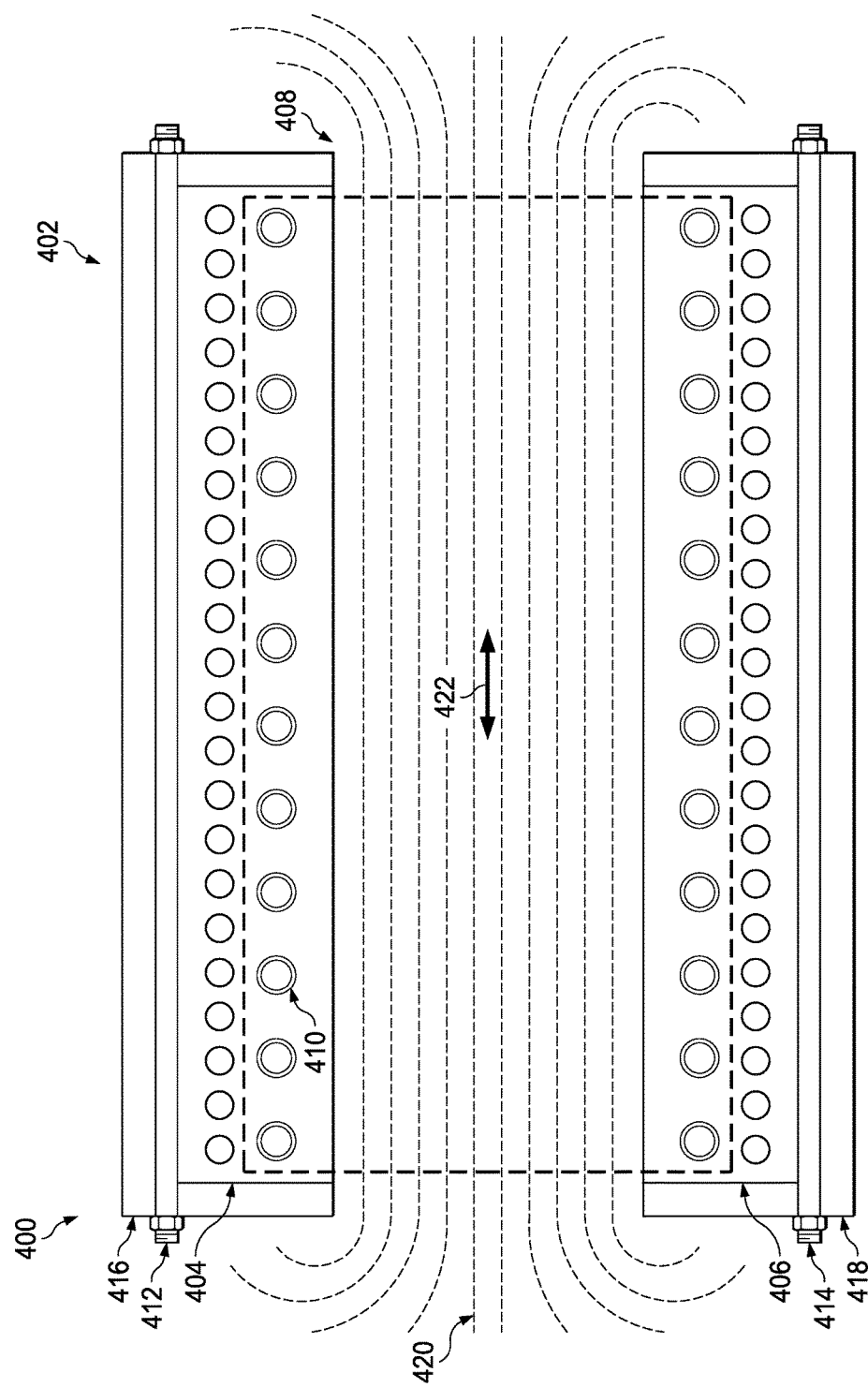
FIG. 4 is an illustration of a cross-sectional view of a tool in accordance with an illustrative embodiment.

Turning now to FIG. 4, an illustration of a cross-sectional view of a tool is depicted in accordance with an illustrative embodiment. View 400 may be a cross-sectional view of tool 300 of FIG. 3. Specifically, view 400 may be a cross-sectional view of tool 300 of FIG. 3 taken along lines 4-4. Tool 402 may be a physical implementation of tool 202 shown in block form in FIG. 2.

As depicted, tool 402 has first die 404 and second die 406 forming die cavity 408 of tool 402. Plurality of induction coils 410 runs through first die 404 and second die 406. Plurality of induction coils 410 are joined by flexible sections (not depicted). Plurality of rods 412 runs through first die 404. Plurality of rods 414 runs through second die 406. First die 404 and second die 406 are held within load constraint 416 and load constraint 418.

Plurality of induction coils 410 generates magnetic flux 420. Magnetic flux 420 travels in direction 422 perpendicular to plurality of induction coils 410 in die cavity 408.

Figure 5:
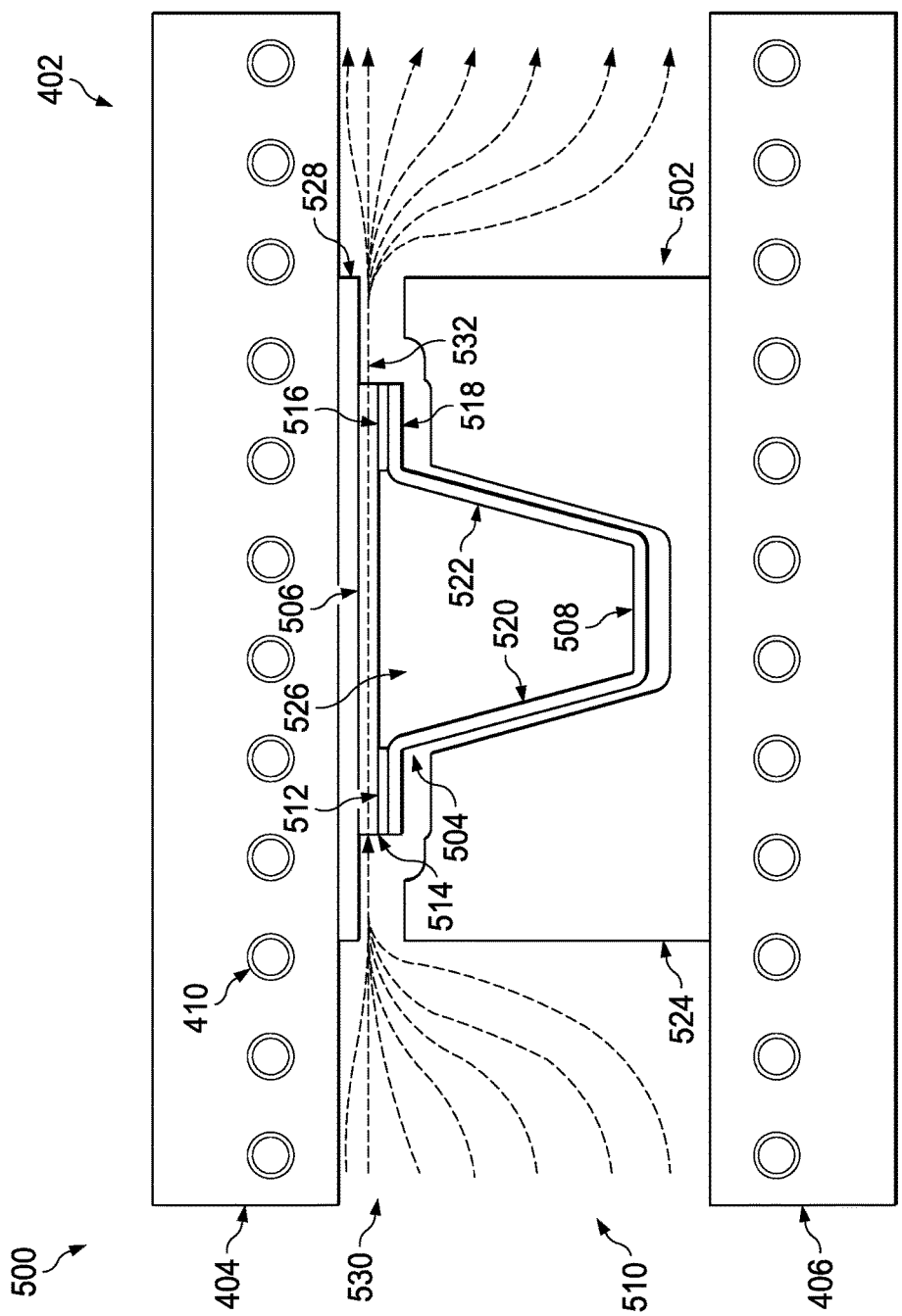
FIG. 5 is an illustration of a cross-sectional view of a flux director and a structure within a tool in accordance with an illustrative embodiment.

Turning now to FIG. 5, an illustration of a cross-sectional view of a flux director and a structure within a tool is depicted in accordance with an illustrative embodiment. View 500 may be a view of flux director 502 and structure 504 within tool 402 of FIG. 4. Structure 504 may be a physical implementation of structure 206 shown in block form in FIG. 2. Flux director 502 may be a physical implementation of flux director 208 of FIG. 2.

To weld first component 506 and second component 508 to form structure 504, power may be supplied to plurality of induction coils 410 to produce magnetic flux 510. As depicted, first component 506 may take the form of a skin. As depicted, second component 508 may take the form of a trapezoidal stiffener. Welding promoter 512 is positioned at joint 514. Welding promoter 516 is positioned at joint 518. Welding promoter 512 and welding promoter 516 may generate heat when exposed to magnetic flux 510. Magnetic flux 510 is directed using flux director 502. Magnetic flux 510 is directed such that magnetic flux 510 encounters welding promoter 512 and welding promoter 516. Further, flux director 502 blocks magnetic flux 510 from encountering leg 520 or leg 522 of second component 508 in a non-parallel direction.

Flux director 502 includes base 524 having cavity 526. Base 524 may be formed of a magnetically opaque material. The material may be selected to be magnetically opaque to a range of frequencies including magnetic flux 510. As depicted, second component 508 may rest within cavity 526. As a result, base 524 may block magnetic flux 510 from encountering leg 520 or leg 522 of second component 508. Flux director 502 also includes cover 528. As depicted, cover 528 is substantially planar. Cover 528 may be formed of a magnetically opaque material. The material may be selected to be magnetically opaque to a range of frequencies including magnetic flux 510. Cover 528 and base 524 form channel 530 through which magnetic flux 510 flows. Path 532 of magnetic flux 510 may be changed by changing channel 530.

View 500 may be a view before welding structure 504. To begin a welding process, base 524 may be placed into tool 402. Second component 508 may be placed into cavity 526 of base 524. Welding promoter 512 and welding promoter 516 may be placed relative to second component 508. First component 506 may be placed over second component 508, welding promoter 512, and welding promoter 516. Cover 528 may be placed over first component 506. Tool 402 may be closed to contact flux director 502. Induction coils 410 may be energized to create magnetic flux 510. Induced currents may be generated circumferentially around smart susceptor wires in welding promoter 512 and welding promoter 516. Thermal leveling of the heated smart susceptor wire may be reached at a desired welding temperature due to the decay of the magnetic properties of the smart susceptor wire. Pressure may be applied to flux director 502 by applying pressure with first die 404 and second die 406. Once welding is achieved, energy to induction coils 410 may be ceased. Afterwards, structure 504 may cool and be unloaded and inspected.

Figure 6:
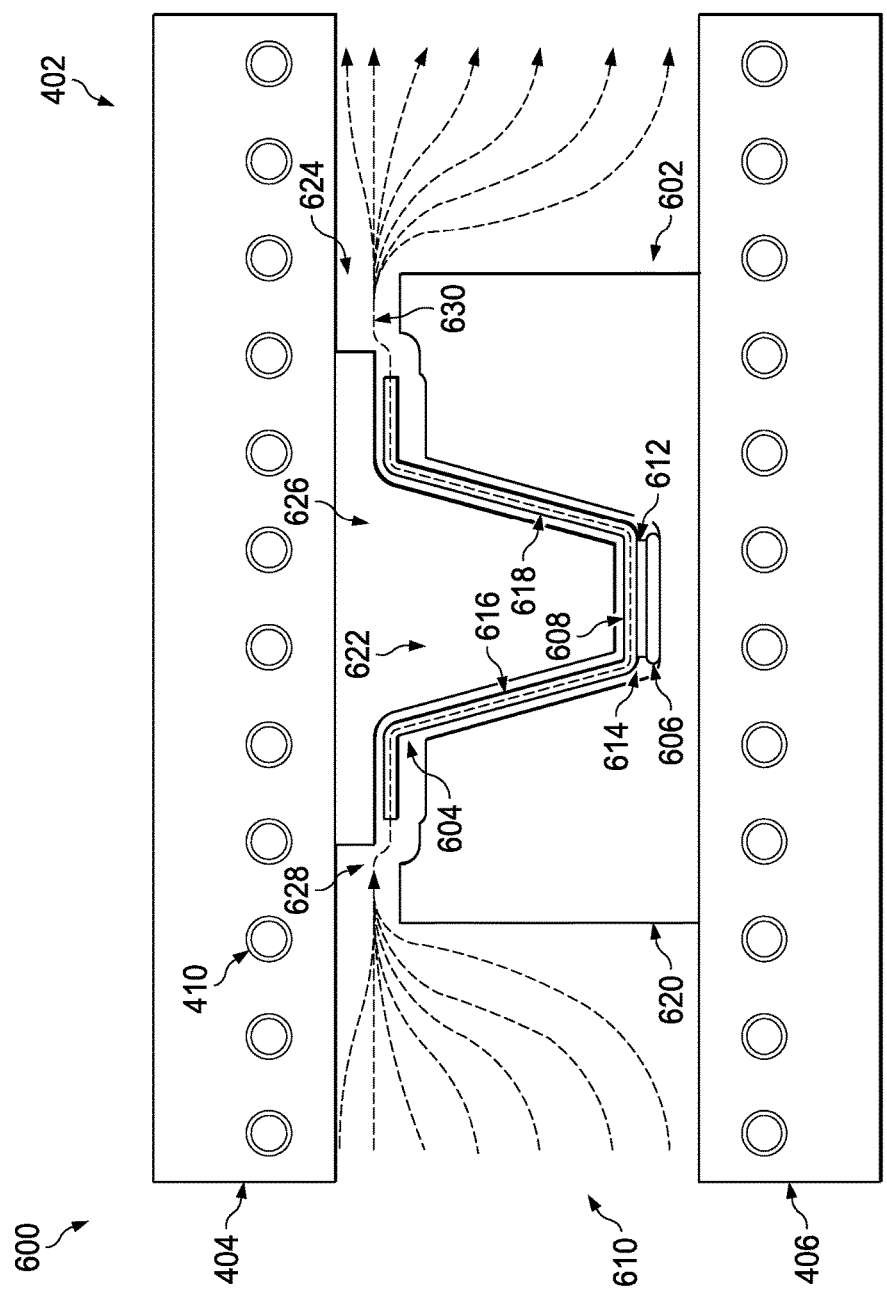
FIG. 6 is an illustration of a cross-sectional view of a flux director and a structure within a tool in accordance with an illustrative embodiment.

Turning now to FIG. 6, an illustration of a cross-sectional view of a flux director and a structure within a tool is depicted in accordance with an illustrative embodiment. View 600 may be a view of flux director 602 and structure 604 within tool 402 of FIG. 4. Structure 604 may be a physical implementation of structure 206 shown in block form in FIG. 2. Flux director 602 may be a physical implementation of flux director 208 of FIG. 2.

To weld first component 606 and second component 608 to form structure 604, power may be supplied to plurality of induction coils 410 to produce magnetic flux 610. As depicted, first component 606 may take the form of a strip. As depicted, second component 608 may take the form of a trapezoidal stiffener. Welding promoter 612 is positioned at joint 614. Welding promoter 612 may generate heat when exposed to magnetic flux 610. Magnetic flux 610 is directed using flux director 602. Magnetic flux 610 is directed such that magnetic flux 610 encounters welding promoter 612. Further, flux director 602 blocks magnetic flux 610 from encountering leg 616 or leg 618 of second component 608 in a non-parallel direction.

Flux director 602 includes base 620 having cavity 622. Base 620 may be formed of a magnetically opaque material. The material may be selected to be magnetically opaque to a range of frequencies including magnetic flux 610. As depicted, both first component 606 and second component 608 may rest within cavity 622. Flux director 602 also includes cover 624. Cover 624 may be formed of a magnetically opaque material. The material may be selected to be magnetically opaque to a range of frequencies including magnetic flux 610. As depicted, cover 624 has protrusion 626. Cover 624 and base 620 form channel 628 through which magnetic flux 610 flows. Path 630 of magnetic flux 610 may be changed by changing channel 628. As depicted, path 630 of magnetic flux 610 is through leg 616 and leg 618 of second component 608.

Figure 7:
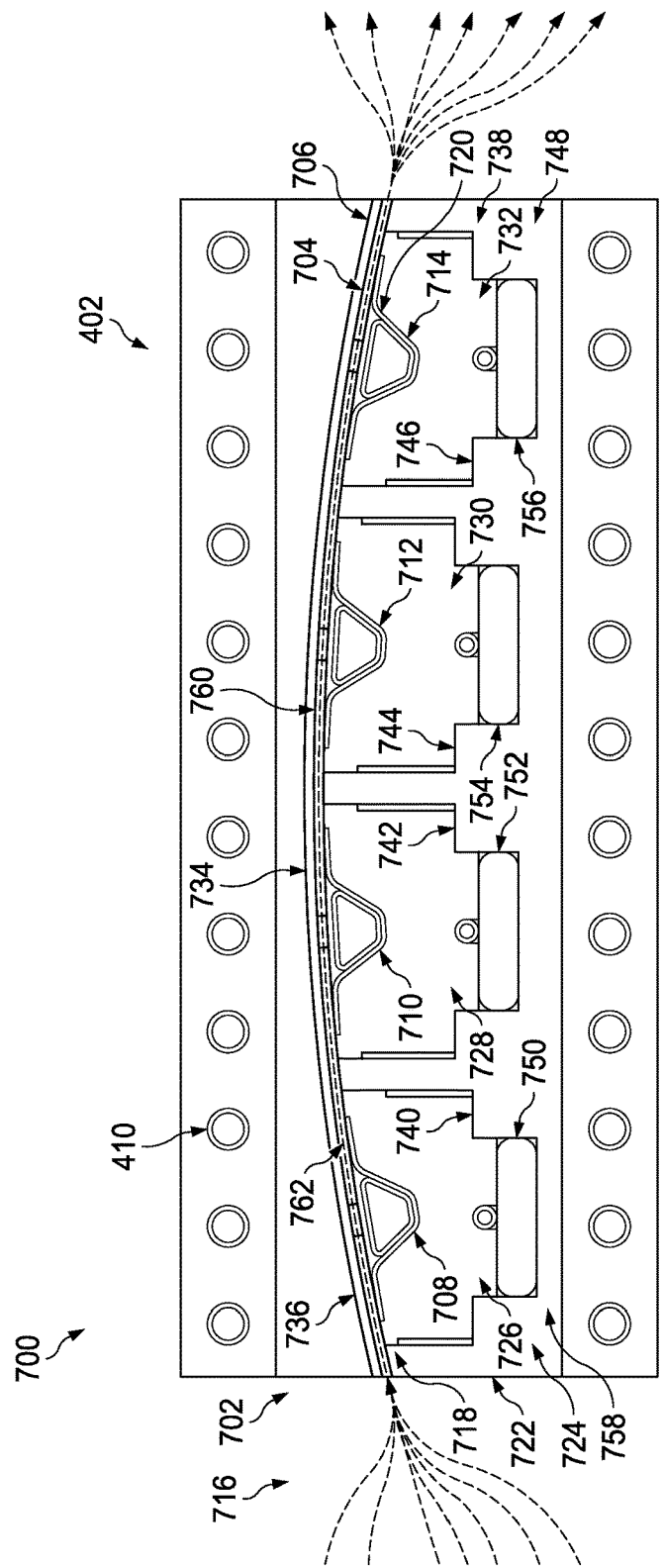
FIG. 7 is an illustration of a cross-sectional view of a flux director and a structure within a tool in accordance with an illustrative embodiment.

Turning now to FIG. 7, an illustration of a cross-sectional view of a flux director and a structure within a tool is depicted in accordance with an illustrative embodiment. View 700 may be a view of flux director 702 and structure 704 within tool 402 of FIG. 4. Structure 704 may be a physical implementation of structure 206 shown in block form in FIG. 2. Flux director 702 may be a physical implementation of flux director 208 of FIG. 2.

To weld first component 706 to second component 708, third component 710, fourth component 712, and fifth component 714 to form structure 704, power may be supplied to plurality of induction coils 410 to produce magnetic flux 716. As depicted, first component 706 may take the form of a skin. As depicted, second component 708, third component 710, fourth component 712, and fifth component 714 may each take the form of a trapezoidal stiffener. Number of welding promoters 718 is positioned at number of joints 720. Number of welding promoters 718 may generate heat when exposed to magnetic flux 716. Magnetic flux 716 is directed using flux director 702. Magnetic flux 716 is directed such that magnetic flux 716 encounters number of welding promoters 718. Further, flux director 702 blocks magnetic flux 716 from encountering the legs of at least one of second component 708, third component 710, fourth component 712, or fifth component 714 in a non-parallel direction.

Flux director 702 includes base 722 having number of cavities 724. Base 722 may be formed of a magnetically opaque material. The material may be selected to be magnetically opaque to a range of frequencies including magnetic flux 716. As depicted, number of cavities 724 includes first cavity 726, second cavity 728, third cavity 730, and fourth cavity 732. As depicted, second component 708 may rest within first cavity 726. As depicted, third component 710 may rest within second cavity 728. As depicted, fourth component 712 may rest within third cavity 730. As depicted, fifth component 714 may rest within fourth cavity 732.

Flux director 702 also includes cover 734. Cover 734 may be formed of a magnetically opaque material. The material may be selected to be magnetically opaque to a range of frequencies including magnetic flux 716. As depicted, cover 734 has arced surface 736. Arced surface 736 contacts first component 706.

Flux director 702 also includes number of inserts 738. In some illustrative examples, number of inserts 738 may be formed of the same magnetically opaque material as at least one of base 722 or cover 734. Number of inserts 738 is placed in number of cavities 724. Number of inserts 738 includes first insert 740, second insert 742, third insert 744, and fourth insert 746. Number of pressure applicators 748 is associated with number of inserts 738. Number of pressure applicators 748 includes first pressure applicator 750, second pressure applicator 752, third pressure applicator 754, and fourth pressure applicator 756. In this illustrative example, number of pressure applicators 748 may be bladders 758. By activating bladders 758, pressure applied to each of second component 708, third component 710, fourth component 712, and fifth component 714 may be individually controlled.

Cover 734, base 722, and number of inserts 738 form channel 760 through which magnetic flux 716 flows. Path 762 of magnetic flux 716 may be changed by changing channel 760. As depicted, path 762 of magnetic flux 716 is substantially the same as arced surface 736.

The illustrations of FIGS. 5-7 are not meant to imply physical or architectural limitations to the manner in which an illustrative embodiment may be implemented. Other components in addition to or in place of the ones illustrated may be used. Some components may be unnecessary.

For example, flux director 702 may not have number of inserts 738. In some illustrative examples, rather than having number of inserts 738, flux director 702 may have base 722 which contacts each of second component 708, third component 710, fourth component 712, and fifth component 714. In this illustrative example, base 722 is solid with number of cavities 724 configured to contact each of second component 708, third component 710, fourth component 712, and fifth component 714.

Turning now to FIG. 8, an illustration of a structure produced is depicted in accordance with an illustrative embodiment. Structure 800 may be a physical implementation of structure 206 shown in block form in FIG. 2. Structure 800 may be a physical implementation of a structure welded using flux director 702 of FIG. 7.

Structure 800 includes skin 802, stiffener 804, stiffener 806, stiffener 808, and stiffener 810. Each of stiffener 804, stiffener 806, stiffener 808, and stiffener 810 may have welding promoters in the respective joints between stiffener 804, stiffener 806, stiffener 808, or stiffener 810 and skin 802.

The different components shown in FIG. 1 and FIGS. 3-8 may be combined with components in FIG. 2, used with components in FIG. 2, or a combination of the two. Additionally, some of the components in FIG. 1 and FIGS. 3-8 may be illustrative examples of how components shown in block form in FIG. 2 can be implemented as physical structures.

FIG. 9 is an illustration of a flowchart of a process for welding a thermoplastic structure in accordance with an illustrative embodiment. Process 900 may be used to direct magnetic flux 240 shown in block form in FIG. 2. Process 900 may block magnetic flux 240 from encountering composite material at a substantially non-parallel angle.

Process 900 begins by generating a magnetic flux using a plurality of induction coils of a tool, wherein the tool comprises a plurality of dies creating a die cavity and the plurality of induction coils, wherein sections of the plurality of induction coils are embedded in the plurality of dies (operation 902). The tool may be an implementation of tool 202 of FIG. 2.

Process 900 then directs the magnetic flux using a flux director positioned within the die cavity (operation 904). The flux director may be flux director 208 of FIG. 2. Afterwards the process may terminate.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

In one illustrative example, process 900 may further comprise inserting a base of the flux director into the die cavity. The base may be formed of a material that is magnetically opaque to a frequency in the range of 30 KHz to 350 KHz. Process 900 may further comprise positioning a cover of the flux director relative to the base to form a channel. The cover may be formed of the material.

In some illustrative examples, process 900 may further comprise positioning a first component and a second component to be joined relative to the base. In some examples, directing the magnetic flux using the flux director comprises directing the magnetic flux to a number of joints between the first component and the second component. In some examples, directing the magnetic flux using the flux director comprises shielding a portion of the first component that is substantially non-parallel to the plurality of dies from the magnetic flux. In some illustrative examples, process 900 further comprises activating a pressure applicator in a cavity of the base to apply pressure to the first component and the second component.

Figure 10:
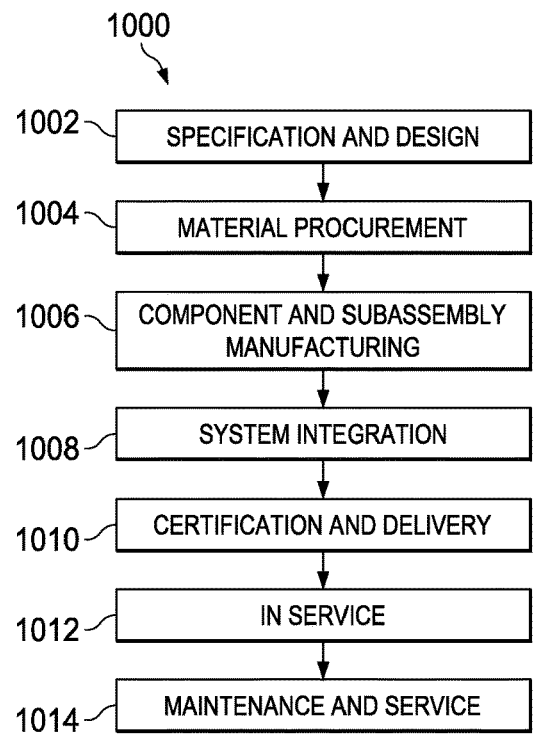
FIG. 10 is an illustration of an aircraft manufacturing and service method in the form of a block diagram in accordance with an illustrative embodiment.
Figure 11:
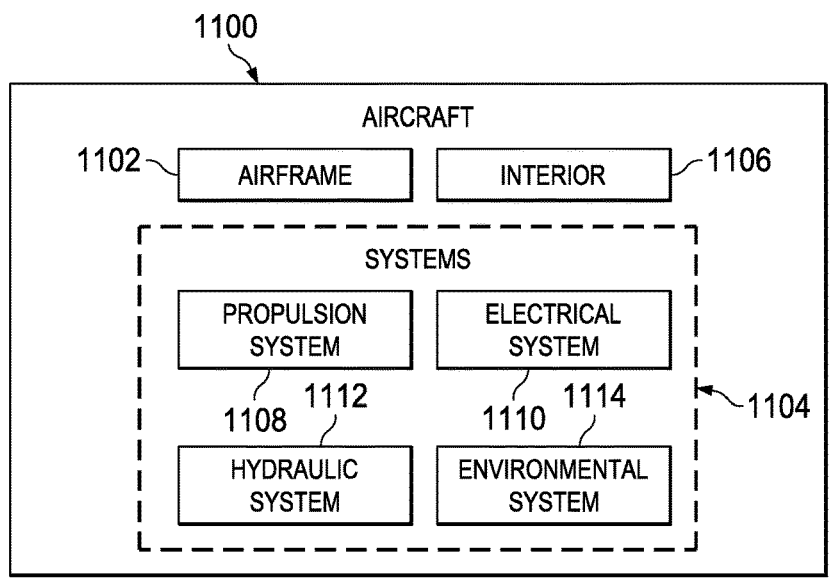
FIG. 11 is an illustration of an aircraft in the form of a block diagram in which an illustrative embodiment may be implemented.

The illustrative embodiments of the disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in the form of a block diagram in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in the form of a block diagram in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000 in FIG. 10. One or more illustrative embodiments may be used during component and subassembly manufacturing 1006. For example, structure 206 shown in block form in FIG. 2 may be welded using flux director 208 of FIG. 2 during component and subassembly manufacturing 1006. Further, structure 206 may also be used to perform replacements during maintenance and service 1014.

The illustrative embodiments provide a method and apparatus for welding thermoplastic structures. A flux director changes the direction of a magnetic flux produced by induction coils of a tool.

The illustrative examples present a flux director comprising a magnetically opaque inner mold insert. The flux director may be used in large coil induction welding using smart susceptors. The flux director may have desirable material properties for multiple uses in welding processes. Further, the flux director may have a desirable material property in that flux director is magnetically opaque to the frequencies of magnetic flux generated by induction coils. Aluminum may be an example of one non-limiting material for the flux director. Aluminum may provide desirable material properties for the flux director.

The flux director is efficient at blocking a magnetic flux from encountering undesirable areas. The flux director may allow only desirable areas, such as the smart susceptors to receive the magnetic flux. By encountering the smart susceptors, the magnetic flux may cause the smart susceptors to heat inductively. Aluminum is conductive and may develop an induced current on the surface of the aluminum mass. This current may effectively block the magnetic flux from penetrating and may guide the magnetic flux to an opening in the flux director. The flux director may direct the magnetic flux in the directions desired. The provided apparatus and method enables guidance of the magnetic flux so it is parallel to the surface of a composite structure being welded. The apparatus and method may also enable blocking the magnetic flux from any surfaces of the composite structure that are not parallel to the field. In some illustrative examples, water cooling of the flux director can be done to eliminate any undesired heat build-up.

The flux director may reduce any undesired heating of the composite structure during welding. The flux director may focus heating in desired locations. For example, the flux director may reduce any heating in portions of a composite structure that are not parallel to the generated magnetic flux. Further, the flux director may focus heating in joint locations between the components of the composite structure.

The flux director may result in at least one of lower manufacturing costs, lower rework rates, or lower manufacturing time. For example, inspection time following welding using a flux director may be reduced. Lowering inspection time may reduce at least one of manufacturing time or manufacturing cost. Further, the flux director may result in composite structures with a higher quality. As a result, fewer composite structures may require rework following welding.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a base formed of a material that is magnetically opaque to a frequency in a range of 30 KHz to 350 KHz;
   a cover formed of the material;
   a channel for magnetic flux extending between the base and the cover;
   wherein the base and the cover are configured to contain a structure and the channel is configured to block the magnetic flux from encountering a portion of the structure in a direction non-parallel to the portion of the structure; and
   a tool comprising:

a plurality of dies that define a die cavity and a plurality of induction coils, wherein sections of the plurality of induction coils are embedded in the plurality of dies, and wherein the base and the cover are positioned in the die cavity.

2. The apparatus of claim 1, wherein the base includes a cavity.

3. The apparatus of claim 2, wherein the cover includes a protrusion extending into the cavity.

4. The apparatus of claim 2 further comprising: an insert formed of the material and positioned in the cavity.

5. The apparatus of claim 4 further comprising: a pressure applicator positioned between the insert and the base.

6. An apparatus comprising:
a tool comprising:
a plurality of dies that define a die cavity and a plurality of induction coils, wherein sections of the plurality of induction coils are embedded in the plurality of dies; and
a flux director positioned within the die cavity;
wherein the flux director comprises a base, a cover, and a channel for magnetic flux between the base and the cover; and
wherein the base and the cover are configured to contain a structure and the channel is configured to block the magnetic flux from encountering a portion of the structure in a direction non-parallel to the portion of the structure.

7. The apparatus of claim 6, wherein the flux director is formed of a material that is magnetically opaque to a frequency in a range of 30 KHz to 350 KHz.

8. The apparatus of claim 7, wherein the flux director has the channel extending through the material.

9. The apparatus of claim 8, wherein the flux director comprises the base and the cover, wherein the base and the cover form the channel.

10. The apparatus of claim 9, wherein the flux director further comprises: a number of inserts in a number of cavities of the base.

11. The apparatus of claim 9, wherein a number of cavities house a number of pressure applicators.

12. A method comprising:
generating a magnetic flux using a plurality of induction coils of a tool, wherein the tool comprises a plurality of dies creating a die cavity and the plurality of induction coils, wherein sections of the plurality of induction coils are embedded in the plurality of dies; and
directing the magnetic flux using a flux director positioned within the die cavity;
wherein the flux director comprises a base, a cover, and a channel for magnetic flux between the base and the cover; and
wherein the base and the cover are configured to contain a structure and the channel is configured to block the magnetic flux from encountering a portion of the structure in a direction non-parallel to the portion of the structure.

13. The method of claim 12 further comprising:
inserting the base of the flux director into the die cavity, wherein the base is formed of a material that is magnetically opaque to a frequency in a range of 30 KHz to 350 KHz.

14. The method of claim 13 further comprising:
positioning the cover of the flux director relative to the base to form the channel, wherein the cover is formed of the material.

15. The method of claim 13 further comprising:
positioning a first component and a second component to be joined relative to the base.

16. The method of claim 15, wherein directing the magnetic flux using the flux director comprises:
directing the magnetic flux to a number of joints between the first component and the second component.

17. The method of claim 16, wherein directing the magnetic flux to the number of joints between the first component and the second component comprises:
directing the magnetic flux through the channel formed by the base and the cover of the flux director.

18. The method of claim 15, wherein directing the magnetic flux using the flux director comprises:
shielding a portion of the first component that is non-parallel to the plurality of dies from the magnetic flux.

19. The method of claim 15 further comprising:
activating a pressure applicator in a cavity of the base to apply pressure to the first component and the second component.

* * * * *